Sept. 1, 1942.                    E. DICKTEN, JR                    2,294,449
                           ALTERNATING CURRENT MOTOR
                    Filed July 11, 1940            2 Sheets-Sheet 1
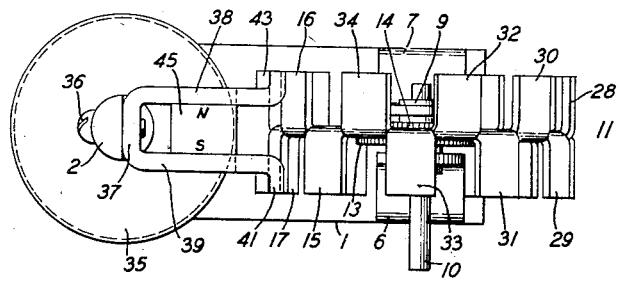
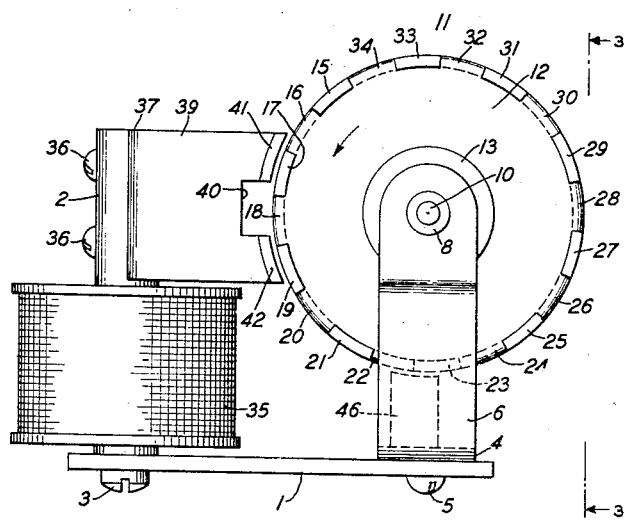
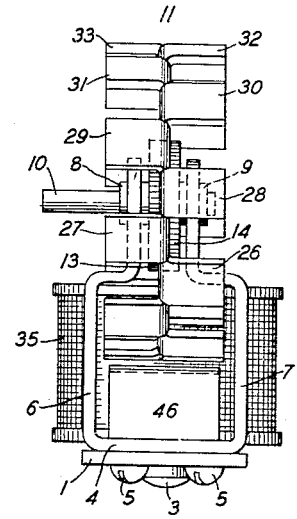
INVENTOR
E. DICKTEN, JR.
BY
P. C. Smith
ATTORNEY Sept. 1, 1942.  E. DICKTEN, JR  2,294,449
ALTERNATING CURRENT MOTOR
Filed July 11, 1940  2 Sheets-Sheet 2

INVENTOR
E. DICKTEN, JR.
BY
P. C. Smith
ATTORNEY

Patented Sept. 1, 1942

2,294,449

UNITED STATES PATENT OFFICE 2,294,449

ALTERNATING CURRENT MOTOR

Emil Dickten, Jr., Totowa, N. J., assignor to Bell Telephone Laboratories, Incorporated, New York, N. Y., a corporation of New York Application July 11, 1940, Serial No. 344,899

14 Claims. (Cl. 172—275)

This invention relates to motors and more particularly to a motor of the self-starting alternating current type.

It is the object of the present invention to provide a self-starting motor which shall be simple in construction and of low manufacturing cost.

It is a further object of the invention to provide a motor which has a low rotor speed.

In attaining these objects I have utilized the same magnetic rectifier principle of operation which I have disclosed in my copending application Serial No. 344,898, filed July 11, 1940.

In accordance with one embodiment of the invention the motor has a rotor which is formed from an iron disc by radially shearing or slitting the periphery thereof and alternately bending down the sections thus formed on either side at right angles to the body of the disc to form rotor pole-pieces. The stator comprises a core upon which the stator winding is positioned, a lower polar extension upon the end of which a U-shaped rotor support is secured between the arms of which the rotor is rotatable and an upper polar extension comprising a magnetic rectifier. The rectifier comprises a U-shaped iron yoke secured by its base to the upper end of the stator core with its arms extending toward and in alignment with the two series of pole-pieces of the rotor. The end of each arm is notched to form two pole-pieces which are bent outwardly at right angles with their outer faces positioned concentric with the peripheral surface of the rotor. The two arms of the yoke are joined by a permanent magnet. A permanent magnet detent is also located between the arms of the rotor support so as to normally position rotor pole-pieces so that they overlap field yoke pole-pieces by approximately one quarter of a pole-piece to insure that the rotor will always rotate in the same direction.

In accordance with a further embodiment of the invention the rotor is made up of two toothed discs each having its teeth bent in the same direction at right angles to the body of the disc, the two discs then being assembled on the rotor shaft back to back with their teeth alternating and extending in opposite directions. The stator of the motor comprises a core upon which the stator winding is positioned and a magnetic rectifier secured to each end of the core. Each rectifier comprises two parallelly disposed pole members extending at right angles to the core in alignment with the two series of pole-pieces of the rotor, each member being notched along its inner edge near its outer end to form two pole-pieces the polar faces of which are concentric with the peripheral surface of the rotor. The two members of each rectifier are joined by a permanent bar magnet.

For a more complete understanding of the invention reference may be had to the following detailed description taken in connection with the accompanying drawings in which:

Fig. 1 is a side elevational view of one embodiment of the motor in accordance with the present invention;

Fig. 2 is a top plan view as viewed along line 2—2 of Fig. 1;

Fig. 3 is an end elevational view as viewed along line 3—3 of Fig. 1;

Figure 5:
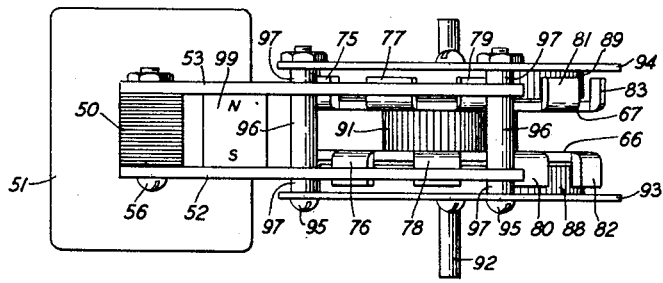
Fig. 5 is a top plan view as viewed along line 5—5 of Fig. 4.

Referring first to Figs. 1 to 3, inclusive, the motor is provided with a support or lower polar extension 1 to one end of which the core 2 is secured by screw 3 and to the other end of which is secured the substantially U-shaped rotor support 4. The rotor support 4 is secured by its base to the polar extension 1 by screws 5 with its upwardly extending arms 6 and 7 lying in planes parallel to the edges of the extension 1. The upper ends of the arms 6 and 7 are indrawn toward each other, as viewed in Fig. 3, and are provided with bushings 8 and 9 secured thereto having aligned holes therethrough which serve as bearings for the rotor shaft 10.

The rotor 11 comprises a web or disc portion 12 to the faces of which are welded or otherwise secured the reinforcing discs 13 and 14. The web 12 and the discs 13 and 14 are provided with aligned axial holes through which the rotor shaft 10 extends. The rotor is suitably secured to the shaft after it has been mounted thereon between the arms 6 and 7 of the support 4. The web or disc portion 12 is radially sheared or slotted at its periphery to form a plurality of teeth or sections, in the case illustrated twenty, alternate ones of which, 15, 17, 19, 21, 23, 25, 27, 29, 31 and 33, are bent at right angles to one side of the web and the others of which, 16, 18, 20, 22, 24, 26, 28, 30, 32 and 34 are bent at right angles to the other side of the web. These teeth or sections form rotor pole-pieces, the pole faces of which form the peripheral surface of the rotor.

A stator winding 35 is positioned around the core 2. Secured by its base by screws 36 to the upper end of the core 2 is a U-shaped polar extension or yoke 37 of magnetic material such as iron. The arms 38 and 39 of the yoke extend toward the rotor 11 parallel to the edges of the lower polar extension 1 and each is notched as indicated at 40 to form two pole-pieces which are bent outwardly at right angles to its outer face and also along an arc concentric with the periphery of the rotor, as illustrated in Fig. 1. Arm 39 is thus provided with the two pole-pieces 41 and 42 and arm 38 is provided with two pole-pieces 43 and 44, the pole faces of which are in alignment with the pole faces of the pole-pieces of the rotor and separated therefrom by narrow air-gaps. The spacing between the centers of the pole faces of pole-pieces 41 and 42 is the same as the spacing between the centers of the pole faces of the rotor pole-pieces 15, 17, etc. and the spacing between the centers of the pole faces of pole-pieces 43 and 44 is the same as the spacing between the centers of the pole faces of the rotor pole-pieces 16, 18, etc. Secured between the arms 38 and 39 of the yoke 37 is a permanent bar magnet 45 with its north pole in engagement with the inner face of the arm 38 and its south pole in engagement with the inner face of the arm 39. The yoke 37 serves as a keeper for the magnet 45 is so proportioned that it is normally essentially saturated by the flux flowing therethrough from the magnet 45.

Positioned between the arms 6 and 7 of the rotor supporting yoke 4 is a permanent magnet detent 46 having one of its polar ends in engagement with the base of yoke 4 and its other polar end positioned adjacent the periphery of the rotor 11 and separated from the pole faces of the pole-pieces thereof by a narrow air-gap. The longitudinal center of the pole face of the magnet 46 is so positioned that normally when two adjacent but oppositely extending pole-pieces such as 22 and 23 of the rotor each have a half of its pole face overlying the pole face of the magnet 46, a quarter of the pole faces of two pole-pieces such as 16 and 18 will overlap the pole faces of the pole-pieces 43 and 44 of the stator yoke or if adjacent but oppositely extending pole-pieces such as 22 and 21 are similarly positioned over the pole face of the magnet 46, a quarter of the pole faces of two pole-pieces such as 15 and 17 will overlap the pole faces of the pole-pieces 41 and 42 of the stator yoke. The magnet detent 46 is provided for the purpose of insuring that the rotor 11 will revolve in a particular direction as indicated by the arrow in Fig. 1.

Considering the operation of the motor, the permanent magnet 45 and the yoke 37 are so proportioned that a flux density is normally produced in the yoke sufficiently large to operate the iron of the yoke in the vicinity of or above the knee of the saturation curve. In this high flux density condition the yoke will still have a low reluctance compared with that of the air-gaps between its pole-pieces 41 to 44 and the pole-pieces of the rotor 11. The permanent magnet flux may be visualized as leaving the north pole of the magnet 45 proceeding around the yoke 37 and entering the magnet at its south pole.

When the stator winding 35 is energized, a field flux will be created which will tend to flow through the core 2, dividing at its junction with the yoke 37 through the arms 38 and 39 thereof, thence across the air-gaps between the pole-pieces of the yoke and the pole-pieces of the rotor 11, uniting in the web 12 of the rotor and returning to the core 2 through the rotor supporting yoke 4 and the lower polar extension 1 but the yoke 37 in combination with the permanent magnet 45 permits field flux to cross the air-gaps associated with only one arm of the yoke at one time depending upon the direction of the energizing current flowing through the winding 35.

It will be assumed that alternating current is supplied to the winding 35 while the rotor 11 is in the position illustrated and that during the first half cycle the direction of the flux due to the current leaves the core 2 and enters the yoke 37. The field flux will oppose the permanent magnet flux in the yoke arm 38 and the flux density in this arm is therefore decreased and flux therefor readily flows across the air-gaps between the pole-pieces 43 and 44 of arm 38 and the pole-pieces 16 and 18 of the rotor and returns to the core 2 through the rotor web 12, rotor supporting yoke 4 and polar extension 1. The pole-pieces 16 and 18 of the rotor will thereupon be moved in the rotary direction indicated by the arrow in Fig. 1 a distance of three quarters of their width or until they are centered with respect to the pole-pieces 43 and 44 of the yoke arm 38. At the same time in the arm 39 of the yoke 37 the field flux aids the permanent magnet flux but, since this arm is already almost or entirely saturated due to the permanent magnet flux, the increased flux in this arm will be slight or nil and the pole-pieces 17 and 19 of the rotor which are opposite the pole-pieces 41 and 42 of the arm 39 will be unaffected.

During this movement of the rotor, the pole-piece 21 thereof is brought to such a position that one quarter of its pole face overlies the pole face of detent magnet 46 and consequently when the current flowing through the winding 35 reaches a zero value, magnet 46 acts to rotate the rotor an amount equal to a quarter pole-piece or until a half of each of the rotor pole-pieces 21 and 22 are positioned over the magnet 46. At this time a quarter of the pole-pieces 15 and 17 overlap the pole-pieces 41 and 42 of the stator yoke arm 39.

During the next half cycle the current supplied to stator winding 35 creates a flow of flux in the opposite direction through the core 2 whereby the field flux will oppose the permanent magnet flux in the arm 39 of the yoke and the flux density in this arm is therefore decreased and flux readily flows across the air-gaps between the pole-pieces 15 and 17 of the rotor and the pole-pieces 41 and 42 of the arm 39. The pole-pieces 15 and 17 of the rotor will thereupon be moved in the rotary direction indicated by the arrow in Fig. 1 a distance of three quarters of their width or until they are centered with respect to the pole-pieces 41 and 42 of the yoke arm 39. At the same time, in the arm 38 of the yoke 37 the field flux aids the permanent magnet flux but, since this arm is already almost or entirely saturated due to the permanent magnet flux, the increase in flux in this arm will be slight or nil and the pole-pieces 16 and 18 of the rotor which are opposite the pole-pieces 43 and 44 of the arm will be unaffected.

During this movement of the rotor, the rotor pole-piece 20 is brought to such a position that one quarter of its pole face overlies the pole face of the detent magnet 46 and consequently when the current flowing through the winding 35 reaches a zero value, magnet 46 acts to rotate the rotor a distance equal to a quarter pole-piece or until a half of each of the rotor pole-pieces 20 and 21 are positioned over the magnet 46. At this time a quarter of the pole-pieces 16 and 34 overlap the pole-pieces 43 and 44 of the stator yoke arm 38.

This cycle of operations continues as long as the alternating current is applied to the winding 35. With twenty pole-pieces on the rotor 11, and 60 cycle alternating current applied to the winding 35, the rotor will revolve at a speed of 360 revolutions per minute. A motor of this type has particular utility where a low speed of the rotor shaft is desired and where high rotor shaft torque is not required, as for example for driving a clock mechanism.

It will be observed that at the instant alternating current is applied to the winding 35, on the first half cycle, the rotor may be so positioned that flux will pass across the gaps where there is a three-quarter rotor pole-piece overlap as, for example, should the first half cycle cause flux to flow across the gaps between the rotor pole-pieces 17 and 19 and the stator yoke arm pole-pieces 41 and 42. In this case the rotor will first be advanced in a direction opposite to that indicated by the arrow a distance equal to the quarter width of the rotor pole-pieces or until the rotor pole-pieces 17 and 19 are centered opposite the stator pole-pieces 41 and 42. Thereafter when the current through the winding 35 reaches a zero value, the rotor pole-pieces 22 and 23 which were moved out of centering alignment when the pole-piece of the detent magnet 46, will be returned to the position shown in Fig. 1. On the next half cycle, the rotor will be advanced as previously described in the proper direction of rotation.

Figure 4:
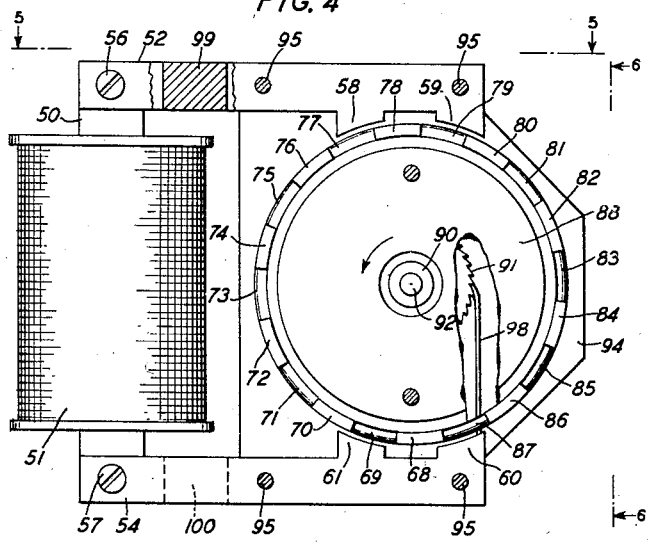
Fig. 4 is a side elevational view of a second embodiment of the motor in accordance with the present invention, one of the rotor shaft bearing plates being omitted to better disclose the rotor.
Figure 6:
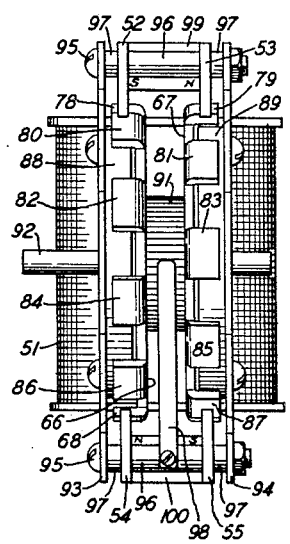
Fig. 6 is an end elevational view as viewed along line 6—6 of Fig. 4.

Referring to Figs. 4 to 6, inclusive, which disclose a further embodiment of the invention, the stator comprises a laminated core 50 supporting thereon the stator winding 51 and having two parallelly disposed pole members 52 and 53 secured to one end thereof by bolt 56 and having two parallelly disposed pole members 54 and 55 secured to the other end thereof by bolt 57. Each pole member is provided on its inner edge near its outer end with two pole-pieces, the pole-pieces of member 52 being designated by numerals 58 and 59 and the pole-pieces of member 54 being designated by numerals 60 and 61. The pole-pieces of member 53 and the pole-pieces of member 55 are similarly disposed. The inner edges of all of the pole-pieces are curved to be concentric with the peripheral surface of the rotor which is rotatably supported with respect thereto. A larger number of pole-pieces could be provided, if desired.

The rotor comprises two discs 66 and 67 of magnetic iron each having ten teeth which are bent at right angles thereto to form pole-pieces, the pole-pieces of disc 66 being indicated by the numerals 68, 70, 72, 74, 76, 78, 80, 82, 84 and 86 and the pole-pieces of disc 67 being indicated by the numerals 69, 71, 73, 75, 77, 79, 81, 83, 85 and 87. The discs 66 and 67 are secured in any suitable manner back to back together with the interposed ratchet wheel 91 on the hub 90 which in turn is mounted on the shaft 92. The two discs 66 and 67 are so disposed that their pole-pieces extend alternately in opposite directions.

The rotor shaft 92 is journaled in bearings in two supporting plates 93 and 94 which are secured to the pole members 52 to 55, inclusive, by bolts 95. For holding the ends of the pole members in the proper spaced relationship spacing sleeves 96 surrounding the bolts 95 are provided and for spacing the plates 93 and 94 from the pole-pieces to provide a spacing between such plates slightly greater than the length of the rotor hub 90, spacing washers 97 surrounding the bolts 95 are provided. Secured to the lower spacing sleeve 96, as viewed in Fig. 6, is a spring pawl 98 the end of which cooperates with the teeth of the ratchet wheel 91 to permit the rotation of the rotor only in the direction indicated by the arrow in Fig. 4.

To improve the magnetic circuit through the rotor two iron washers 88 and 89 are positioned inside the pole-pieces of the rotor discs 66 and 67 and secured to the plates 93 and 94 by screws. The rotor discs rotate freely around these washers. One of these washers 88 is disclosed in its position within the rotor disc 66 in Fig. 4.

Secured between the pole members 52 and 53 is a permanent bar magnet 99 which, with these pole members and the upper end of the core 50, constitutes a magnetic rectifier. Similarly, a second bar magnet 100 is secured between the pole members 54 and 55 and with such members and the lower end of the core 50, constitutes a second magnetic rectifier.

Considering the operation of the motor, the permanent magnet 99 and the members 52 and 53 are so proportioned that a flux density is normally produced sufficiently large to operate the iron of the members 52 and 53 in the vicinity of or above the knee of the saturation curve. The permanent magnet flux from magnet 99 may be visualized as leaving the north pole of the magnet, proceeding around the yoke formed by the member 53, the end of core 50 and the member 52 and entering the magnet 99 at its south pole. Also the permanent magnet 100 and the members 54 and 55 are so proportioned that a flux density is normally produced sufficiently large to operate the iron of such members in the vicinity of or above the knee of the saturation curve. The permanent magnet flux from magnet 100 may be visualized as leaving the north pole of the magnet proceeding around the yoke formed by the member 54, the end of core 50 and the member 55 and entering the magnet 100 at its south pole.

It will be assumed that alternating current is supplied to the winding 51 while the rotor is in the position illustrated and that during the first half cycle the direction of the flux due to the current leaves the core 50 and enters the lower magnetic rectifier. The field flux will oppose the permanent magnet flux in the member 54 and the flux density in this member is therefore decreased. At the same time the field flux will leave the upper magnetic rectifier and enter the upper end of the core 50 whereby the field flux will oppose the permanent magnet flux in the member 52 and the flux density in this member is therefore decreased. Flux will therefore readily flow from the pole member 54 across the air-gaps between the pole-pieces 60 and 61 thereof and the pole-pieces 68 and 70 of the rotor through the rotor disc 66 and the washer 88 across the air-gaps between the rotor pole-pieces 78 and 80 and the pole-pieces 58 and 59 of the pole member 52. The pole-pieces 68, 70, 78 and 80 of the rotor will therefore be moved in the rotary direction indicated by the arrow in Fig. 4 a distance of three quarters of their width or until they are centered with respect to the pole-pieces 58, 59, 60 and 61 of the pole members 52 and 54. At the same time in the pole members 53 and 55 the field flux aids the flux from the magnets 99 and 100 but, since these members are already almost or entirely saturated due to the permanent magnet flux, the increase of flux in these members will be slight or nil and the pole-pieces 87 and 69 of the rotor which overlap the pole-pieces of the member 55 and the pole-pieces 77 and 79 of the rotor which overlap the pole-pieces of the member 53 will be unaffected. The rotor has thus been advanced in the rotary direction indicated by the arrow and, due to the inertia of the rotor, its pole-pieces 69, 71, 79 and 81 will be advanced to a position in which they will overlap the pole-pieces of the pole members 53 and 55 by a quarter pole-piece and will be held in such position by the engagement of the pawl 98 with a tooth of the ratchet wheel 91.

On the next half cycle the current supplied to the stator winding 51 creates a flow of flux in the opposite direction through the core 50 whereby the field flux will oppose the permanent magnet flux in the pole members 53 and 55 and the flux densities in these members is therefore decreased and flux readily flows across the air-gaps between the pole-pieces of pole member 53 and the pole-pieces 79 and 81 of the rotor through the disc 67 and the washer 89 and across the air-gaps between the rotor pole-pieces 69 and 71 and the pole-pieces of the pole member 55 whereby the pole-pieces 69, 71, 79 and 81 are moved a distance of three quarters of their width in the direction of the arrow or until they are centered with respect to the pole-pieces of the pole members 53 and 55. At the same time in the pole members 52 and 54 the field flux aids the permanent magnet flux but, since these members are already almost or entirely saturated due to the permanent magnet flux, the increase in flux in these members will be slight or nil and the pole-pieces 70, 72, 80 and 82 which overlap the pole-pieces 58 to 61, inclusive, will be unaffected. This cycle of operations continues as long as the alternating current is applied to the winding 51.

What is claimed is:

1. In a self-starting alternating current motor, a stator core, a stator winding thereon, a magnetic rectifier in series with said core comprising two pole members secured to one end thereof each having a plurality of pole-pieces and a permanent magnet interconnecting said members adjacent to their free ends, and a rotor positioned in the magnetic circuit extending serially through said core and rectifier having two sets of pole-pieces for cooperation respectively with the pole-pieces of said pole members whereby flux generated by said stator winding is impeded or aided in its flow through one or the other of said members dependent upon the direction of the current by which said winding is energized.

2. In a self-starting alternating current motor, a stator core, a stator winding thereon, two parallelly disposed members of magnetic material secured to one end of said core each having a plurality of pole-pieces, a permanent magnet interconnecting said members adjacent to their free ends and a rotor positioned in the magnetic circuit extending serially through said core and said members having two sets of pole-pieces for cooperation respectively with the pole-pieces of said members.

3. In a self-starting alternating current motor, a stator core, a stator winding thereon, two parallelly disposed members of magnetic material secured to one end of said core, each having a plurality of pole-pieces, a permanent magnet interconnecting said members adjacent to their free ends for substantially magnetically saturating said members and a rotor magnetically associated with the other end of said core in the magnetic circuit extending serially through said core and said members and having two sets of pole-pieces for cooperation respectively with the pole-pieces of said members.

4. In a self-starting alternating current motor, a stator core, a stator winding thereon, two parallelly disposed members of magnetic material secured to one end of said core each having a plurality of pole-pieces, a permanent magnet interconnecting said members adjacent to their free ends, a rotor positioned in the magnetic circuit extending serially through said core and said members having two sets of pole-pieces for cooperation respectively with the pole-pieces of said members, a ratchet wheel on the rotor shaft and a pawl cooperating therewith for permitting the rotation of said rotor in but one direction.

5. In a self-starting alternating current motor, a stator core, a stator winding thereon, a pair of parallelly disposed members of magnetic material secured to each end of said core, each member having a plurality of pole-pieces, a permanent magnet bridged across each pair of said members for substantially magnetically saturating said members, and a rotor rotatably supported between said pairs of members and having two sets of pole-pieces for cooperation respectively with the pole-pieces of corresponding members of said pairs of members.

6. In a self-starting alternating current motor, a stator core, a stator winding thereon, a pair of parallelly disposed members of magnetic material secured to each end of said core, each member having a plurality of pole-pieces, a permanent magnet bridged across each pair of said members for substantially magnetically saturating said members, and a rotor rotatably supported between said pairs of members and comprising two toothed discs of magnetic iron having their teeth bent in opposite directions and disposed in staggered relationship to form two sets of pole-pieces for cooperation respectively with the pole-pieces of corresponding members of said pairs of members.

7. In a self-starting alternating current motor, a stator core, a stator winding thereon, a pair of parallelly disposed members of magnetic material secured to each end of said core, the members of each pair being positioned on opposite sides of the core and each member having a plurality of pole-pieces, a permanent magnet bridged across the members of each pair, said magnets being oppositely poled whereby said members are substantially magnetically saturated, and a rotor rotatably supported between said pairs of members and having two sets of pole-pieces for cooperation respectively with the pole-pieces of said members which are positioned on the same side of said core.

8. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, and a rotor magnetically associated with the other end of said core and having two sets of pole-pieces for cooperation respectively with the pole-pieces of said yoke arms.

9. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, and a rotor magnetically associated with the other end of said core and having two sets of pole-pieces for cooperation respectively with the pole-pieces of said yoke arms, the pole-pieces of one set being positioned in staggered relationship to the pole-pieces of the other set.

10. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, and a rotor magnetically connected to the other end of said core and comprising a disc of magnetic iron having its periphery divided into a plurality of sections alternately bent in opposite directions to form two sets of pole-pieces for cooperation respectively with the pole-pieces of said yoke arms.

11. In a self-starting alternating current motor, a stator core, a stator winding thereon, a U-shaped yoke of magnetic material secured to one end of said core having each of its arms notched to form a plurality of pole-pieces, each of which pole-pieces is bent outwardly at right angles and the pole faces of which all lie in the same arcuate surface, a permanent magnet bridged across the arms of said yoke, a rotor comprising a disc of magnetic iron having its periphery divided into a plurality of sections alternately bent at right angles in opposite directions to form two sets of pole-pieces for cooperation respectively with the pole-pieces of said yoke arms, and a support for said rotor magnetically connecting said rotor with the other end of said core, whereby said rotor is positioned with the peripheral surface of its pole-pieces separated from the pole faces of said yoke arm pole-pieces by narrow air-gaps.

12. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, a rotor magnetically associated with the other end of said core and having two sets of pole-pieces for cooperation respectively with the pole-pieces of said yoke arms, and a detent co-operating with said rotor for insuring that said rotor shall rotate in but one direction.

13. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, a rotor magnetically associated with the other end of said core, and having two sets of pole-pieces for cooperation respectively with the pole-pieces of said yoke arms, and a permanent magnet having one of its poles cooperatively associated with pole-pieces of both sets of rotor pole-pieces for insuring that said rotor shall rotate in but one direction.

14. In a self-starting alternating current motor, a stator core, a stator winding thereon, a U-shaped yoke of magnetic material secured to one end of said core having each of its arms formed with a plurality of pole-pieces, a permanent magnet bridged across the arms of said yoke, a rotor magnetically connected to the other end of said core and comprising a disc of magnetic iron having its periphery divided into a plurality of sections alternately bent in opposite directions to form two sets of pole-pieces for cooperation respectively with the pole-pieces of said yoke arms, and a permanent magnet having one of its poles cooperatively associated with pole-pieces of both sets of rotor pole-pieces whereby when no current is flowing in said stator winding pole-pieces of rotor will be positioned with respect to the pole-pieces of that one of said yoke arms which will cause the rotation of said rotor in a predetermined direction upon the next energization of said winding.

EMIL DICKTEN, Jr.